United States Patent
Wirmark

[19]

[11] Patent Number: 6,122,908
[45] Date of Patent: Sep. 26, 2000

[54] DEVICE AND METHOD FOR PURIFICATION OF EXHAUST GAS

[75] Inventor: Göran Wirmark, Göteborg, Sweden

[73] Assignee: AB Volvo, Sweden

[21] Appl. No.: 09/214,470

[22] PCT Filed: Jul. 21, 1997

[86] PCT No.: PCT/SE97/01302

§ 371 Date: May 11, 1999

§ 102(e) Date: May 11, 1999

[87] PCT Pub. No.: WO98/04815

PCT Pub. Date: Feb. 5, 1998

[30] Foreign Application Priority Data

Jul. 22, 1996 [SE] Sweden .................................. 9602833

[51] Int. Cl.[7] .................................................. F01N 3/00
[52] U.S. Cl. ........................ 60/274; 60/279; 60/281; 60/283; 123/518; 123/519; 123/520
[58] Field of Search ........................ 60/274, 278, 279, 60/281, 288, 309, 283; 123/518, 519, 520

[56] References Cited

U.S. PATENT DOCUMENTS

| | | | |
|---|---|---|---|
| 3,908,371 | 9/1975 | Nagai et al. ................................ | 60/301 |
| 5,207,734 | 5/1993 | Day et al. ................................... | 60/278 |
| 5,239,824 | 8/1993 | Matsumo .................................... | 60/283 |
| 5,272,873 | 12/1993 | Hamazaki .................................. | 60/283 |
| 5,806,304 | 9/1998 | Price et al. ................................. | 60/274 |

FOREIGN PATENT DOCUMENTS

| | | |
|---|---|---|
| 0 422 432 A1 | 4/1991 | European Pat. Off. . |
| 34 25 461 A1 | 1/1986 | Germany . |
| 41 34 199 A1 | 4/1993 | Germany . |
| 41 40 090 A1 | 6/1993 | Germany . |
| 89/10470 | 11/1989 | WIPO . |
| 92/22734 | 12/1992 | WIPO . |
| 93/07365 | 4/1993 | WIPO . |
| 96/17157 | 6/1996 | WIPO . |

*Primary Examiner*—Thomas Denion
*Assistant Examiner*—Binh Tran
*Attorney, Agent, or Firm*—Lerner, David, Littenberg, Krumholz & Mentlik, LLP

[57] ABSTRACT

Apparatus for the purification of exhaust gases from internal combustion engines is disclosed including a conduit for connecting the exhaust pipe from the engine with a canister containing an adsorbent for at least one of the components of the exhaust gases, and a valve associated with the conduit for selectively directing the exhaust gases from the exhaust pipe to the canister when the valve is open. Methods for purification of such exhaust gases are also disclosed including monitoring an operating condition for the internal combustion engine and controlling the flow of the exhaust gases from the engine to the exhaust pipe in response to the monitored operating condition, controlling of the flow including selectively directing at least a portion of the exhaust gases from the exhaust pipe to the canister.

20 Claims, 2 Drawing Sheets

DEVICE AND METHOD FOR PURIFICATION OF EXHAUST GAS

FIELD OF THE INVENTION

The present invention relates to a device for purification of exhaust gases. More particularly, the present invention relates to such devices for use in connection with the purification of exhaust gases in a motor vehicle, in particular for the reduction of exhausts of pollutants from the engine of the vehicle. The invention also relates to a method for the purification of exhaust gases.

BACKGROUND OF THE INVENTION

In connection with vehicles which use internal combustion engines, there is a general desire for reducing the exhaust of harmful substances in the exhaust gas from the engine. These harmful substances are primarily pollutants in the form of nitrogen oxide compounds ($NO_x$), hydrocarbon compounds (HC) and carbon monoxide (CO).

In modern motor vehicles with gasoline engines, purification of the exhaust gases is normally carried out by means of an exhaust gas catalyzer in the exhaust gas system, through which the exhaust gases flow. In a so-called known three-way catalyzer, the main portion of the abovementioned harmful substances is eliminated by means of known catalytic reactions.

Although modern three-way catalyzers normally have a very high degree of purification, which to a very large extent limits the exhausts of harmful pollutants into the atmosphere, there are presently demands for even lower exhausts of harmful substances from motor vehicles. These demands arise, among other things, from increasingly restrictive legislation in various countries, with demands for extremely low exhausts of $NO_x$, CO and HC-compounds. Modern conventional three-way catalyzers also have a drawback in that they have a relatively low degree of purification when cold-starting an engine, i.e. the catalyzer is not able to provide optimal purification from the start of the engine until the catalyzer has reached its so-called "light-off" temperature. In modern vehicles, the light-off temperature is from about 200° to 350°, and can be defined as the temperature at which the catalyzer provides 50% purification of a certain harmful component in the exhaust gases.

The initial period of time which elapses until the lightoff temperature is reached is, in modern vehicles, normally from about 30 to 90 seconds. During this time, a certain amount of harmful components in the exhaust gases will thus pass through the exhaust system of the internal combustion engine and out into the surrounding atmosphere. In order to minimize these harmful exhausts, there is thus a need to minimize the time which elapses until the catalyzer reaches its light-off temperature. This can be obtained, for example, by developing new catalyzer materials which exhibit constantly lower ignition temperatures, and by developing methods for rapid heating of the catalyzer. A reduction of the harmful emissions from an internal combustion engine can also be obtained by utilizing a HC-adsorbent which is arranged in the exhaust pipe in order to adsorb the undesired components in the exhaust gases, until that point in time when the catalyzer has reached its light-off temperature.

A previously known method for reducing the harmful exhausts from an internal combustion engine is to combine its regular catalyzer with another, electrically heatable, starting catalyzer which is placed upstream of the regular catalyzer. Since the starting catalyzer is heated rapidly using electricity, its catalytic deposition quickly becomes active, thus causing a significant purification of the exhaust gases at low idling flows. The exhaust gases which flow therethrough are heated further, which in turn shortens the heating time of the regular catalyzer. A device which comprises such a heatable starting catalyzer, which provides an improved purifying effect when cold-starting the engine, is previously known from International Publication No. WO 89/10470.

A drawback associated with electrically heatable starting catalyzers is that they require a very large current supply. This creates high demands on the electrical system of the vehicle, as well as higher costs since, for example, an extra starting battery is normally necessary in order to power the starting catalyzer. Another problem with such systems is the amount of time during which they can be used. Since the starting catalyzer ages relatively rapidly, degraded performance sets in quickly.

Another arrangement for the reduction of harmful exhausts from an internal combustion engine disclosed in European Patent No. 0,422,432, and comprises a combustion chamber in which combustible components in the exhaust gases can be ignited in order to raise the temperature of the gases which pass the catalyzer. Thus, the temperature of the catalyzer itself can be raised more quickly than normal.

A drawback with such an arrangement, however, is that the amount of unused components in the form of hydrocarbons, carbon monoxide, hydrogen and oxygen is often insufficient to cause rapid and reliable heating of the catalyzer. Also, an extra component in the form of an ignition means in order to ignite a gas compound becomes necessary.

Other devices intended to reduce harmful exhausts are disclosed in International Publication Nos. WO 92/22734 and WO 93/07365. These documents disclose systems with an after-burner in the exhaust system, in which a mixture of exhaust gases which reach a certain ignition zone in the after-burner can be ignited using an ignition device. In order to obtain the desired concentrations in the mixture of exhaust gases, the mixture of fuel/air to the engine is controlled so that a predetermined surplus of hydrogen is obtained in the gas mixture while secondary air is supplied using a pump.

A drawback in this latter arrangement is that it requires a separate ignition device in order to ignite the gas mixture, which raises the cost. Additionally, a special air-pump is necessary for the supply of secondary air, which adds further to the cost. A further drawback is that this device requires a relatively large amount of space in the vehicle.

A further method of reducing the emissions from an internal combustion engine is to utilize a so-called HC-adsorbent or HC-trap. A device which comprises an HC-adsorbent is disclosed in Swedish patent application no. 9302407-3. To be more precise, this arrangement comprises an HC-adsorbent which is arranged in the exhaust pipe, upstream of an electrically heatable starting catalyzer and a conventional three-way catalyzer. The HC-adsorbent is arranged to adsorb, i.e. "gather" HC-compounds in the exhaust gases before the three-way catalyzer has reached its light-off temperature. When the temperature in the flow of exhaust gases reaches a certain temperature, the HCadsorbent will emit (desorb) those HC-compounds which have previously been gathered.

A substantial drawback with previously known HC-adsorbents is that they age due to the temperature of the exhaust gases.

This ageing process causes a lowered temperature limit for desorption of the HC-adsorbent. This causes the HC-adsorbent to emit its HC-compounds before the ordinary catalyzer has ignited.

According to these prior systems, a reduction in harmful exhausts is realized by shortening the time which elapses until the catalyzer reaches its lightoff temperature. Using previously known technology, the light-off temperature can be reached within about 10 to 15 seconds following a cold-start. As regards exhausts of HC-compounds, the concentration of these substances is very high approximately 2 to 4 seconds following a cold-start, which is of major significance in those systems which do not utilize an HC-adsorbent or corresponding technology. In such systems, there is only a limited reduction of the exhausts of HC-compounds in connection with cold-starts, although they significantly shorten the time which elapses until the catalyzer reaches its light-off temperature.

An object of the present invention is thus to provide an improved device for the purification of harmful components, in particular HC-compounds in the exhaust gases of an internal combustion engine, without using an HC-adsorbent in the exhaust pipe.

SUMMARY OF THE INVENTION

In accordance with the present invention, this and other objects have now been realized by the invention of apparatus for the purification of exhaust gases from an internal combustion engine including an exhaust pipe for transporting the exhaust gases from the internal combustion engine and a canister containing an adsorbent for at least one component of the exhaust gases, the apparatus comprising a first conduit for connecting the exhaust pipe with the canister and a first controllable valve associated with the first conduit for selectively directing the exhaust gases from the exhaust pipe to the canister when the valve is open. In accordance with one embodiment, the apparatus includes a controller for the first controllable valve, wherein the controller can control the first controllable valve between a first condition wherein at least a portion of the exhaust gases are directed to the canister and a second condition wherein the exhaust gases are directed to the atmosphere through the exhaust pipe. In a preferred embodiment, the internal combustion engine includes an injector for injecting a mixture of fuel and air into the internal combustion engine, and a second conduit for connecting the canister to the injector, the apparatus further including a third conduit for connecting the canister to the atmosphere whereby air from the atmosphere can flow through the third conduit and the canister into the second conduit. In accordance with a preferred embodiment, the apparatus includes a second controllable valve associated with the second conduit, the second controllable valve being controlled by the controller between a first condition wherein the second controllable valve is closed and a second condition wherein the second controllable valve is open, whereby the second controllable valve is in the first condition when the first controllable valve is in the first condition and the second controllable valve is in the second condition when the first controllable valve is in the second condition.

In accordance with one embodiment of the apparatus of the present invention, the internal combustion engine includes a fuel tank and a fourth conduit for connecting the internal combustion engine to the fuel tank, the apparatus further including a third controllable valve associated with the fourth conduit whereby the third controllable valve can prevent the exhaust gases from flowing into the fuel tank.

In accordance with another embodiment of the apparatus of the present invention, the first controllable valve is adapted to selectively direct the exhaust gases from the exhaust pipe to the canister during a predetermined time period after the ignition of the internal combustion engine. Preferably, the predetermined time period comprises less than about 15 seconds.

In accordance with another embodiment of the apparatus of the present invention, the first controllable valve is adapted to selectively direct the exhaust gases from the exhaust pipe to the canister in response to at least one predetermined condition of the internal combustion engine. Preferably, the internal combustion engine includes an exhaust gas catalyzer associated with the exhaust pipe, and the at least one predetermined condition of the internal combustion engine comprises a temperature of the exhaust gas catalyzer. In a preferred embodiment, the apparatus includes a controller for the first controllable valve, wherein the controller can control the first controllable valve between a first condition wherein at least a portion of the exhaust gases are directed to the canister and a second condition wherein the exhaust gases are directed to the atmosphere through the exhaust pipe, and a temperature detector associated with the exhaust gas catalyzer, the temperature detector connected to the controller whereby the first controllable valve can be controlled based on the temperature detected by the temperature detector.

In accordance with one embodiment of the apparatus of the present invention, the at least one predetermined condition can be the temperature of a cooling fluid in the internal combustion engine, the temperature of the atmosphere, and/or the rate of flow of the exhaust gases in the exhaust pipe.

In accordance with another embodiment of the apparatus of the present invention, the apparatus includes a fourth controllable valve associated with the first conduit whereby the fourth controllable valve can close the first conduit.

In accordance with another embodiment of the apparatus of the present invention, the adsorbent is adapted to adsorb nitrogen oxide compounds, hydrocarbon compounds, and/or carbon monoxide.

In accordance with another embodiment of the apparatus of the present invention, the apparatus includes a fifth conduit connected to the exhaust pipe, whereby the fifth conduit can supply secondary air to the exhaust pipe.

In accordance with the present invention, a canister is also provided containing an adsorbent for at least one component of exhaust gases from an internal combustion engine including an exhaust pipe for the exhaust gases, the canister including a connection for a first conduit for connecting the canister to the exhaust pipe of the internal combustion engine whereby the exhaust gases can be directed from the exhaust pipe to the canister.

In accordance with one embodiment of the canister of the present invention, the canister includes a connection for a second conduit comprising an outlet for the exhaust gases, the connection for the second conduit disposed proximate to the connection for the first conduit whereby the exhaust gases flowing from the connection for the first conduit to the connection for the second conduit will only traverse a minor portion of the canister. In a preferred embodiment, the adsorbent comprises activated carbon for the adsorption of hydrocarbon compounds, and the canister further comprises an adsorbent for a compound such as carbon dioxide and/or nitrogen oxide compounds in the exhaust gases.

In accordance with the present invention, a method has been provided for the purification of exhaust gases from an internal combustion engine including an exhaust pipe for transporting the exhaust gases from the internal combustion engine and a canister containing an absorbent for at least one component of the exhaust gases, the method comprising monitoring at least one predetermined operating condition for the internal combustion engine and controlling the flow of the exhaust gases from the internal combustion engine to the exhaust pipe in response to the monitored at least one operating condition, the controlling of the flow including selectively directing at least a portion of the exhaust gases from the exhaust pipe to the canister.

In one embodiment, the internal combustion engine includes a first controllable valve associated with the exhaust pipe, and selectively directing of the at least a portion of the exhaust gases from the exhaust pipe to the canister comprises controlling the first controllable valve. In a preferred embodiment, controlling of the first controllable valve includes opening the first controllable valve during a predetermined period of time after a cold start of the internal combustion engine. In another embodiment, the internal combustion engine includes an exhaust gas catalyzer associated with the exhaust pipe, and the method further includes detecting the temperature of the exhaust gas catalyzer and controlling the first controllable valve in response to the detected temperature of the exhaust gas catalyzer. In a preferred embodiment, the method includes selecting the detected temperature of the exhaust gas catalyzer based upon at least one operating parameter of the internal combustion engine.

In accordance with one embodiment of the method of the present invention, the internal combustion engine includes an injector for injecting a mixture of fuel and air into the internal combustion engine, a first conduit for connecting the canister to the fuel tank and a second conduit for connecting the canister to the injector, the method including blocking the first conduit connecting the canister to the fuel tank and the second conduit connecting the connector to the injector while directing the exhaust gases to the canister.

The present invention is intended to be utilized for the purification of exhaust gases in an internal combustion engine which is equipped with a canister which comprises an adsorbing substance for adsorbing and storing a particular component which it is desired to reduce. A basic principle of the present invention is that it comprises a conduit which connects the exhaust pipe of the engine to the canister, and a dirigible valve arranged in the exhaust pipe. This valve is arranged so that it can assume an active condition in which the exhaust gases in the exhaust pipe are led to the canister through the conduit. In this manner, exhaust gases can be led to the canister, and the component can be adsorbed and stored in the canister.

The term "canister" in this context refers to an essentially conventional receptacle, which includes a substance for the adsorption and storing of fuel vapors from the fuel tank of an internal combustion engine.

BRIEF DESCRIPTION OF THE DRAWINGS

The present invention will now be described in more detail with reference to the following detailed description, which refers to the appended drawings in which.

DETAILED DESCRIPTION

Figure 1:
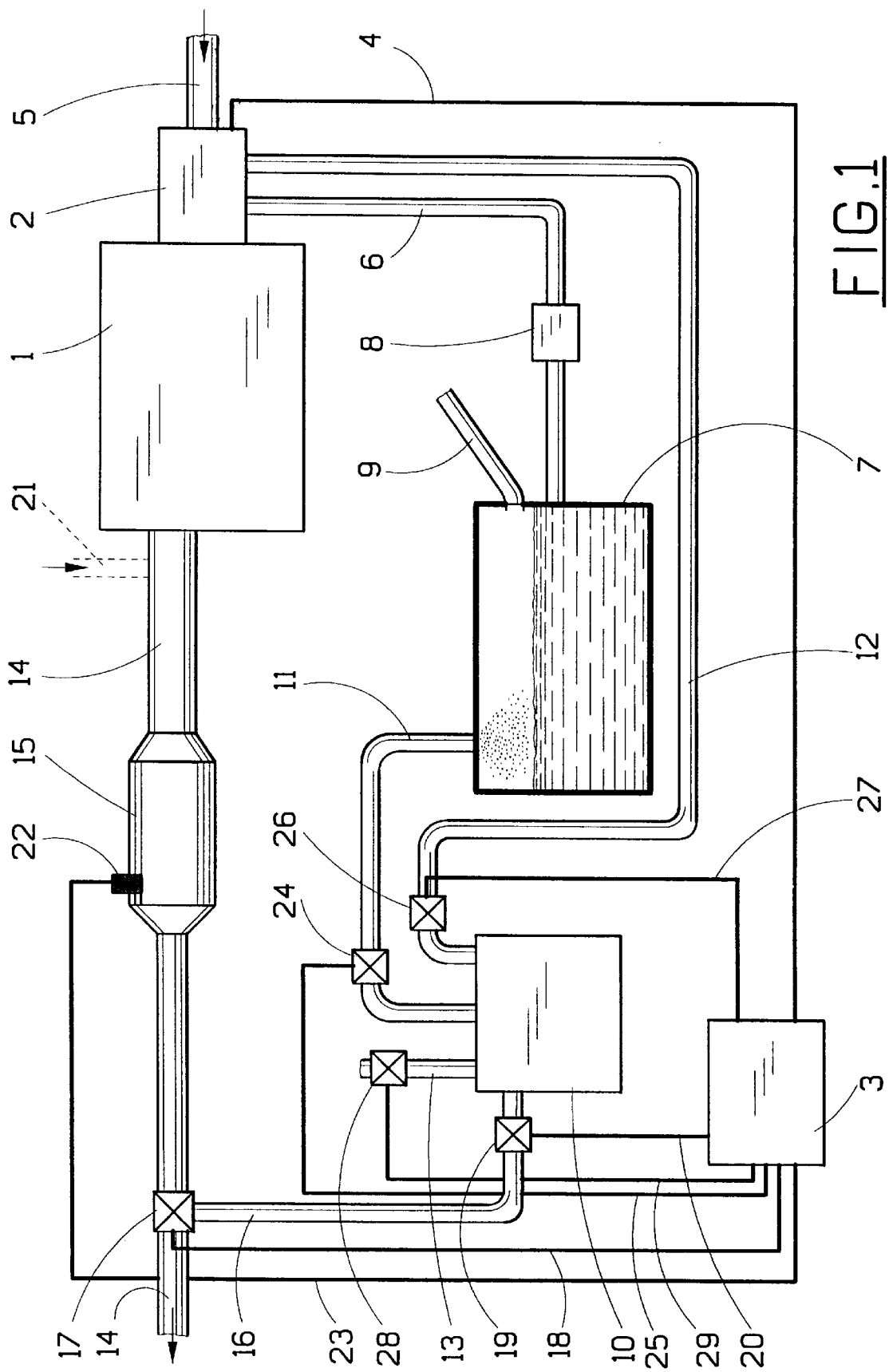
FIG. 1 is a schematic representation of a device according to the present invention.

Referring to the Figures, in which like reference numerals refer to like elements thereof, FIG. 1 schematically shows a device according to the present invention. According to a preferred embodiment, the present invention is primarily intended to be utilized in connection with a conventional internal combustion engine 1 of, for example, the gasoline-powered type. This figure is simplified and does not show all of the components of a conventional combustion engine, but shows only those parts which are necessary for understanding the present invention.

The engine 1 is, in a known manner, supplied with a fuel/air mixture by means of an injection device 2, the function of which is controlled by a control unit 3, which preferably is computer based. The control unit 3 is connected to the injection device 2 by an electrical connection 4. There is an inlet 5 for air, which is supplied from the surrounding atmosphere, connected to the injection device 2, and a fuel pipe 6 for the supply of fuel. Fuel is pumped from a fuel tank 7 by means of a fuel pump 8. The fuel tank 7 is, in a conventional manner, provided with a filling pipe 9.

When the tank 7 contains fuel, different components of the fuel will evaporate from the surface of the liquid to varying degrees. In order to prevent volatile fuel vapors from leaking from the tank 7 to the surrounding atmosphere, these vapors are passed from the tank 7 to a canister 10 through an evaporation pipe 11. The canister 10 preferably contains a certain amount of active carbon, and functions as a filter or adsorbent, which adsorbs and stores the fuel vapors, from the tank 7.

There is also a further pipe 12, leading from the canister 10 to the injection device 2. During operation of the engine 1, there will be a certain underpressure in the pipe 12, which will cause the fuel vapors which have been stored in the canister 10 to be sucked into the pipe 12 and supplied to the engine 1 (through the injection device 2), following which they will be combusted. In order to facilitate flushing through of the canister 10, the canister comprises a channel 13, through which air from the surrounding atmosphere can be sucked in as the fuel vapors are sucked out of the canister 10. This has a cleansing effect on the canister 10.

In a conventional manner, the exhaust gases are led out of the engine 1 through an exhaust pipe 14. An exhaust gas catalyzer 15 is preferably arranged at a suitable position along the exhaust pipe 14. Exhaust gases which pass through the exhaust pipe 14 are led out to the surrounding atmosphere.

According to the present invention, there is a special exhaust conduit 16 connected to the exhaust pipe 14, preferably downstream of the catalyzer 15. This exhaust conduit 16 connects the exhaust pipe 14 with the canister 10. The purpose of this arrangement is to lead the exhaust gases from the engine 1 into the canister 10 under certain circumstances, as will be described below. For this purpose, the exhaust pipe 14 is provided with a valve 17 which is dirigible, so that the exhaust gases which flow through the exhaust pipe 14 completely or partially can be directed to the conduit 16 and into the canister 10. The valve 17 is preferably of the three-way type, and is connected to the control unit 3 by a further electrical connection 18. The control unit 3 is arranged to control the function of the valve 17. In particular, the valve 17 can assume an "active" state in which the exhaust gases are completely or partially directed to the exhaust conduit 16, and an "inactive" state in which the exhaust conduit 16 is blocked, and the exhaust gases in a conventional manner are led out through the exhaust pipe 14 through its opening. For reasons of safety, the valve 17 is preferably designed so that a "fail-safe" function is obtained; i.e., so that the exhaust gases are always led out to the surrounding atmosphere through the exhaust pipe 14 if there is an abnormally high exhaust gas pressure. The valve 17 is also preferably placed far back in the exhaust pipe 14, where the temperature does not affect the reliability of the valve negatively.

The exhaust conduit 16 is preferably provided with a second valve 19, which is located at the point where the exhaust conduit 16 leads into the canister 10. This valve 19 functions as a safety valve, which is arranged so that it can block a flow of exhaust gases through the conduit 16 into the canister 10. This might be necessary in case of leakage at the above-mentioned valve 17. In order to control the second valve 19, it is connected to the control unit 3 by a further electrical connection 20.

The exhaust catalyzer 15 can furthermore be combined with a previously known device for shortening the time which elapses until the light-off temperature has been reached, for example an electrically heatable starting catalyzer. Such further additions to the catalyzer 15 are however not shown in FIG. 1.

The function of the present invention will now be described. When the engine 1 is cold-started, the exhausts of $NO_x$, HC and CO pollutants from the exhaust pipe 14 are high, as mentioned above. The main reason for this is that a certain amount of time is necessary until the catalyzer 15 is able to purify these components. In particular, there is a very high concentration of HC-compounds during the first seconds after start. This is described with reference to FIG. 2, which shows the concentration of HC-compounds in the exhaust gases as a function of the time t which elapses after a cold-start of the engine 1. In the figure, it can be seen that a high HC-concentration, on the order of size of about 1000 to 1500 ppm or more, is reached immediately after a cold-start. This concentration then decreases relatively quickly after having reached a maximal value.

With renewed reference to FIG. 1, the control unit 3 is arranged to be able to control the valve 17 in its active state, so that exhaust gases in the exhaust pipe 14 are completely or partially directed to the exhaust conduit 16. The exhausts which are led through the exhaust conduit 16 will reach the canister 10, where the HC-compounds of the exhaust gases will be adsorbed and stored in the active carbon which is present in the canister 10. The other components of the exhaust gases will, following this, flow out through the channel 13, which in this respect thus functions as an outlet.

According to one embodiment of the present invention, the control unit 3 is arranged to hold the valve 17 in its active state during a certain period of time, preferably about 10 to 15 seconds, when idling the engine 1 after start-up. After this period of time, the valve 17 is set to its inactive state, and the exhaust gases are led out through the ordinary exhaust pipe 14.

The exhaust gases are directed through the canister 10 primarily during the idling phase, which corresponds to relatively small flows of exhaust gases and relatively low decreases in pressure over the canister 10. This means that the system according to the present invention can suitably be utilized together with a system for providing secondary air to the exhaust pipe. This is due to the fact that such a system can be utilized in connection with controlling of the fuel/air mixture to the engine, so that a predetermined surplus of hydrogen and carbon oxide is obtained in the gas mixture. If secondary air is supplied at the same time, using a (not shown) pump, conditions are created for exhaust gas oxidation, which causes a large amount of heat energy to be generated in the exhaust pipe. This in turn, shortens the time until the light-off temperature of the catalyzer 15 is reached. For reasons of clarity, broken lines show an inlet conduit 21 for secondary air, which can be utilized together with control of the exhaust gases through the canister 10, according to the present invention. The inlet conduit 21 is, for this reason, connected to a (not shown) controllable air pump.

In order to obtain a more optimal function of the invention, the control unit 3 can, according to an alternative embodiment, be arranged to control the function of the valve 17 depending on a predetermined operational condition of the vehicle. An example of one such operational condition is the temperature of the catalyzer 15. This gives an indication as to whether the light-off temperature of the catalyzer 15 has been reached, which in turn indicates whether the valve 17 needs to be set to its active position. In order to be able to control the valve 17 depending on the temperature of the catalyzer 15, the invention comprises a temperature detector 22 which is arranged in connection with the catalyzer 15, and which is connected to the control unit 3 by an electrical connection 23. The control unit 3 is arranged to set the valve to its active state if the temperature measured by the temperature detector 22 is below a certain preset value. This value preferably corresponds to the light-off temperature of the catalyzer 15. When the preset value is reached, the valve 17 is set to its inactive state.

Alternatively, the control unit 3 can set a "virtual" value of the temperature of the catalyzer 15 without the need to utilize a special temperature detector for the catalyzer 15. This is obtained by the control unit 3 being arranged to set a temperature value as a function of one or several parameters which relate to operation of the engine 1, for example the temperature of the cooling liquid of the engine, or some other parameter, for example the ambient temperature. Detectors for measuring these temperatures are not shown in FIG. 1. Such a virtual value of the temperature of the catalyzer 15 can thus be detected and utilized when controlling the valve 17.

According to an alternative embodiment, the function of the valve 17 can be controlled depending on the flow of exhaust gases in the exhaust pipe 14. For this purpose, the control unit 3 is connected to a (not shown) flow meter which indicates a value of the flow in the exhaust pipe 14.

The exhaust gases which are led through the canister 10 should not be led further out into conduits 11 and 12 which connect the canister 10 with the fuel tank 7 and the injection device 2, respectively, particularly since it is not desirable to have an undefined flow of gas to the injection device 2. This is particularly the case during the starting and idling phase of the engine 1. For this purpose, the conduit 11 is, according to this embodiment, provided with a controllable clack valve 24 which prevents flow in the direction towards the fuel tank 7. The clack valve 24 is connected to the control unit 3 by means of an electrical connection 25. The conduit 12 is also provided with a controllable so-called purge valve 26, which is connected to the control unit 3 by a further electrical connection 27. The purge valve 26 is arranged to block the flow through conduit 12 when the valve 17 is in its active state, i.e. when exhaust gases are led through the canister 10.

Figure 2:
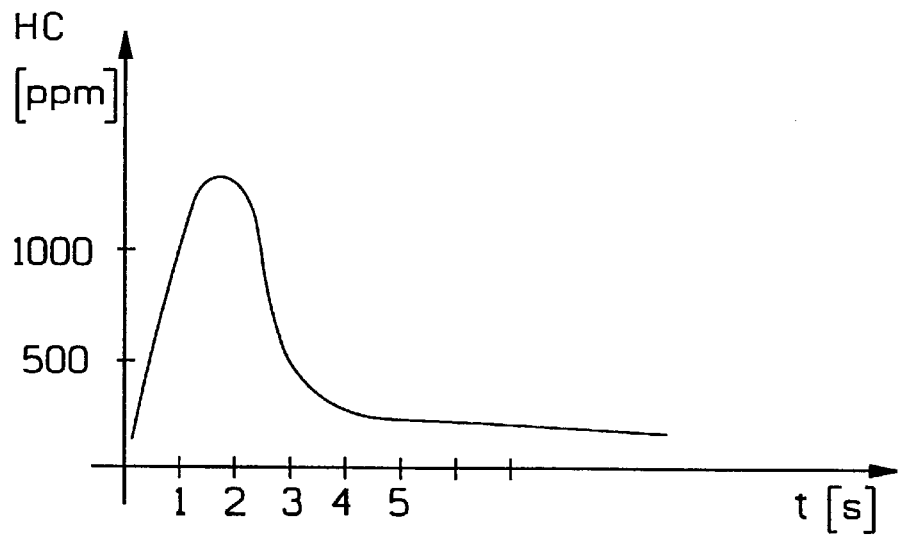
FIG. 2 is a schematic representation showing the concentration of hydrocarbon compounds in the exhaust gases of an engine as a function of time.

In the case of normal cold-starts, the valve 17 is set to its active position for approximately 2 to 10 seconds. With reference to FIG. 2, it can be seen that the main portion of the harmful HC-compounds which are emitted by the engine 1 will be adsorbed and stored in the canister 10, which in turn causes a large reduction of the harmful exhausts of these substances. The maximal time during which exhaust gases can be led into the canister 10 is limited by, among other things, the temperature of the exhaust gases. The canister 10 is normally designed to withstand a temperature as high as approximately 100° C., which is a temperature which the exhaust gases reach approximately 60 seconds after a cold-start. The flow of exhaust gases through the canister 10 is also limited by the maximal flow of exhaust gases which the canister 10 can receive, which, in turn, depends on the pressure in the exhaust pipe 14. This is of particular importance when the invention is used together with systems which comprise the supply of secondary air.

When the valve 17 is set to its inactive state, exhaust gases from the engine 1 will be led through the exhaust pipe 14 in a conventional manner. At the same time, the purge valve 26 switches over to normal purge function, which is controlled by the control unit 3 which, for this purpose, is arranged to open the purge valve 26 during certain predetermined operational conditions. This causes the conduit 12 to permit transport of fuel vapors from the canister 10 to the injection device 2. During this purge function, an existing underpressure in the conduit 12 will affect the canister 10, so that air is sucked in through the channel 13 and flushes through the canister 10. In this way, the canister 10 is flushed clean of carbohydrate compounds which come from the exhaust gases, and which previously have been stored in the canister 10.

The channel 13 is furthermore preferably provided with a controllable valve 28 which is connected to the control unit 3 by an electrical connection 29. The purpose of this arrangement is to enable the valve 28 to be closed during diagnosis of the function of the system.

Figure 3:
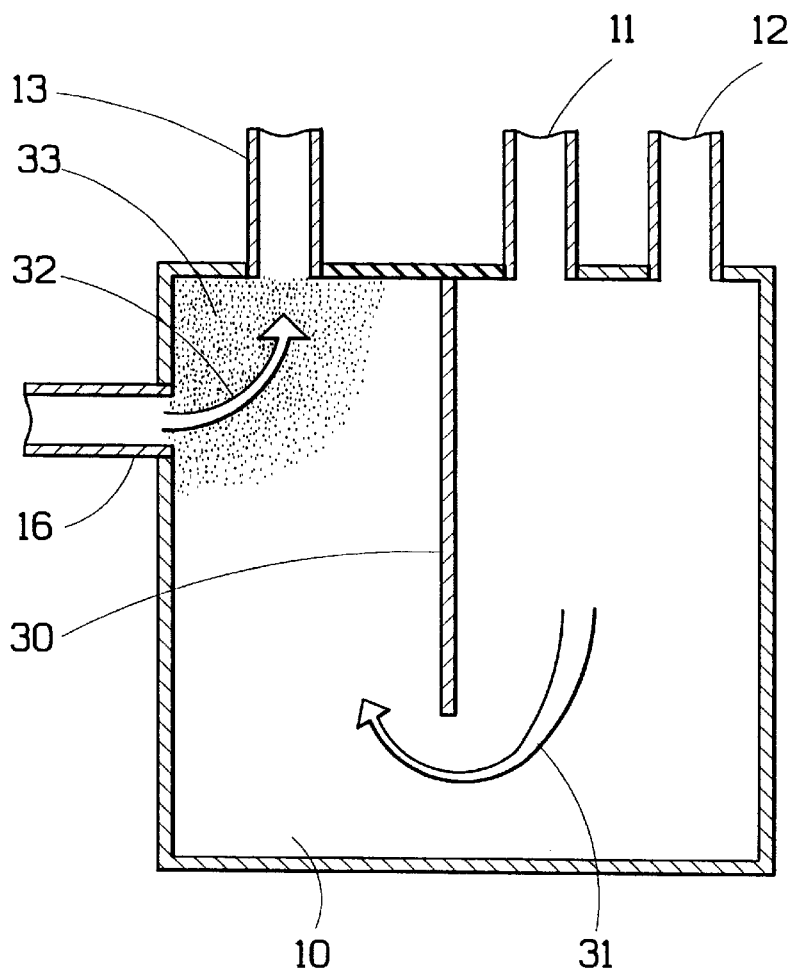
FIG. 3 is a side, elevational, cross-sectional view of a canister which is intended to be utilized in connection with the present invention.

If secondary air is provided through the conduit 21, relatively low counter-pressures will be required in the exhaust pipe 14. This in turn creates a need for small decreases in pressure over the canister 10 primarily during idling rpm. This can be achieved by using only a certain portion of the content of the canister 10 for adsorbing and storing HC-compounds from the exhaust gases. The principle of this is shown in FIG. 3, which is a simplified cross-sectional view through the canister 10 and the conduits 11, 12, 13 and 16, which are connected to the canister 10. The canister 10 is, as mentioned above, filled with active carbon or a corresponding material for the adsorption of HC-compounds. The canister 10 also comprises an intermediate wall 30, the purpose of which is to direct the flow of fuel vapors which enter through the conduit 11 through essentially the entire bed of active carbon, in the direction indicated by the arrow 31.

According to the present invention, the conduit 16 for the supply of exhaust gases is arranged close to the conduit 13. The purpose of this arrangement is for the flow of exhaust gases, as indicated by the arrow 32, to be directed only through a relatively small portion of the carbon bed in the canister 10. This is possible since the canister 10 is normally dimensioned to house a relatively large amount of HC-compounds which come from the fuel vapors from the fuel tank, while the flow of exhaust gases from the conduit 16 carry with them a relatively small amount of hydrocarbon compounds. This means that only a small predetermined part 33 of the total volume of the canister 10 needs to be utilized for the adsorption of HC-compounds which come from the exhaust gases. According to this embodiment, the conduits 13 and 16 are arranged so that approximately 1 to 10% of the total volume of the canister 10 is utilized for the flow of exhaust gases, which provides a sufficient adsorption capacity.

The arrangement with positioning of the conduits 16 and 13 provides an advantage in that only a relatively small decrease in pressure takes place over the canister 10. This is advantageous when using the invention in connection with secondary air systems as described above.

According to one embodiment of the present invention, the canister 10 can be completely or partially filled with another adsorbing substance for the adsorption of $NO_x$-compounds or carbon monoxide (CO). For example, base metal oxides or inert metals can be utilized for adsorbing carbon monoxide. A mixture of active carbon and such an NO, or CO adsorbing substance can also be utilized in the canister 10. In this way, the exhausts of, for example, $NO_x$-compounds and carbon monoxide (CO) from the engine 1 can also be limited.

According to a further embodiment of the present invention, the contents of the canister 10 can be distributed so that an adsorbing substance for $NO_x$-compounds or carbon oxides is placed adjacent to the inlet of the conduit 16 in the canister 10 (in connection to the area 33); i.e., so that these substances essentially are only utilized for the flow of exhaust gases via the conduit 16.

The present invention is not limited to the above described embodiment, but can be varied within the scope of the appended claims. The invention can, for example, be utilized in connection with one or several means for shortening of the time until the exhaust gas catalyzer 15 reaches the light-off temperature, for example systems-with an electrically heatable starting catalyzer.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. Apparatus for the purification of exhaust gases from an internal combustion engine including an exhaust pipe for transporting said exhaust gases from said internal combustion engine and a canister containing an adsorbent for at least one component of said exhaust gases, said apparatus comprising a first conduit for connecting said exhaust pipe with said canister, a first controllable valve associated with said first conduit for selectively directing said exhaust gases from said exhaust pipe to said canister when said valve is open and a controller for said first controllable valve, wherein said controller selectively controls said first controllable valve between a first condition wherein at least a portion of said exhaust gases are directed to said canister and a second condition wherein said exhaust gases are directed to the atmosphere through said exhaust pipe.

2. The apparatus of claim 1 wherein said internal combustion engine includes an injector for injecting a mixture of fuel and air into said internal combustion engine, and a second conduit for connecting said canister to said injector, said apparatus further including a third conduit for connecting said canister to the atmosphere whereby air from said atmosphere flows through said third conduit and said canister into said second conduit.

3. The apparatus of claim 2 including a second controllable valve associated with said second conduit, said second controllable valve being controlled by said controller between a first condition wherein said second controllable valve is closed and a second condition wherein said second controllable valve is open, whereby said second controllable valve is in said first condition when said first controllable valve is in said first condition and said second controllable valve is in said second condition when said first controllable valve is in said second condition.

4. Apparatus for the purification of exhaust gases from an internal combustion engine including an exhaust pipe for transporting said exhaust gases from said internal combustion engine, a canister containing an adsorbent for at least one component of said exhaust gases, a fuel tank, and an additional conduit for connecting said canister to said fuel tank, said apparatus comprising a first conduit for connecting said exhaust pipe with said canister, a first controllable valve associated with said first conduit for selectively directing said exhaust gases from said exhaust pipe to said canister when said valve is open, said apparatus further including a third controllable valve associated with said additional conduit whereby said third controllable valve selectively prevents said exhaust gases from flowing into said fuel tank.

5. Apparatus for the purification of exhaust gases from an internal combustion engine including an exhaust pipe for transporting said exhaust gases from said internal combustion engine and a canister containing an adsorbent for at least one component of said exhaust gases, said apparatus comprising a first conduit for connecting said exhaust pipe with said canister, a first controllable valve associated with said first conduit for selectively directing said exhaust gases from said exhaust pipe to said canister when said valve is open and said first controllable valve is adapted to selectively direct said exhaust gases from said exhaust pipe to said canister during a predetermined time period after the ignition of said internal combustion engine.

6. The apparatus of claim 5 wherein said predetermined time period comprises less than about 15 seconds.

7. Apparatus for the purification of exhaust gases from an internal combustion engine including an exhaust pipe for transporting said exhaust gases from said internal combustion engine and a canister containing an adsorbent for at least one component of said exhaust gases, said apparatus comprising a first conduit for connecting said exhaust pipe with said canister, a first controllable valve associated with said first conduit for selectively directing said exhaust gases from said exhaust pipe to said canister when said valve is open, said first controllable valve is adapted to selectively direct said exhaust gases from said exhaust pipe to said canister in response to at least one predetermined condition of said internal combustion engine.

8. The apparatus of claim 7 wherein said internal combustion engine includes an exhaust gas catalyzer associated with said exhaust pipe, and wherein said at least one predetermined condition of said internal combustion engine comprises a temperature of said exhaust gas catalyzer.

9. The apparatus of claim 8 including a controller for said first controllable valve, wherein said controller can control said first controllable valve between a first condition wherein at least a portion of said exhaust gases are directed to said canister and a second condition wherein said exhaust gases are directed to the atmosphere through said exhaust pipe, and a temperature detector associated with said exhaust gas catalyzer, said temperature detector connected to said controller whereby said first controllable valve is adapted to be selectively controlled based on the temperature detected by said temperature detector.

10. The apparatus of claim 7 wherein said at least one predetermined condition is selected from the group consisting of the temperature of a cooling fluid in said internal combustion engine, the temperature of the atmosphere, and the rate of flow of said exhaust gases in said exhaust pipe.

11. Apparatus for the purification of exhaust gases from an internal combustion engine including an exhaust pipe for transporting said exhaust gases from said internal combustion engine and a canister containing an adsorbent for at least one component of said exhaust gases, said apparatus comprising a first conduit for connecting said exhaust pipe with said canister, a first controllable valve associated with said first conduit for selectively directing said exhaust gases from said exhaust pipe to said canister when said valve is open, and an additional controllable valve associated with said first conduit whereby said additional controllable valve selectively opens and closes said first conduit.

12. Apparatus for the purification of exhaust gases from an internal combustion engine including an exhaust pipe for transporting said exhaust gases from said internal combustion engine and a canister containing an adsorbent for at least one component of said exhaust gases, said apparatus comprising a first conduit for connecting said exhaust pipe with said canister, a first controllable valve associated with said first conduit for selectively directing said exhaust gases from said exhaust pipe to said canister when said valve is open, said adsorbent is adapted to adsorb a component selected from the group consisting of nitrogen oxide compounds, hydrocarbon compounds, and carbon monoxide.

13. Apparatus for the purification of exhaust gases from an internal combustion engine including an exhaust pipe for transporting said exhaust gases from said internal combustion engine and a canister containing an adsorbent for at least one component of said exhaust gases, said apparatus comprising a first conduit for connecting said exhaust pipe with said canister, a first controllable valve associated with said first conduit for selectively directing said exhaust gases from said exhaust pipe to said canister when said valve is open and an additional conduit connected to said exhaust pipe, whereby said additional conduit selectively supplies secondary air to said exhaust pipe.

14. A canister containing an adsorbent for at least one component of exhaust gases from an internal combustion engine including an exhaust pipe for said exhaust gases, said canister including a connection for a first conduit for connecting said canister to said exhaust pipe of said internal combustion engine whereby said exhaust gases can be directed from said exhaust pipe to said canister, a connection for a second conduit comprising an outlet for said exhaust gases, said connection for said second conduit disposed proximate to said connection for said first conduit whereby said exhaust gases flowing from said connection for said first conduit to said connection for said second conduit will only traverse a minor portion of said canister, said adsorbent comprising activated carbon for the adsorption of hydrocarbon compounds, and said canister further comprising an adsorbent for a compound selected from the group consisting of carbon oxide and nitrogen oxide compounds in said exhaust gases.

15. A method for the purification of exhaust gases from an internal combustion engine including an exhaust pipe for transporting said exhaust gases from said internal combustion engine and a canister containing an absorbent for at least one component of said exhaust gases, said method comprising monitoring at least one predetermined operating condition for said internal combustion engine and controlling the flow of said exhaust gases from said internal combustion engine to said exhaust pipe in response to said monitored at least one operating condition, said controlling of said flow including selectively directing at least a portion of said exhaust gases from said exhaust pipe to said canister.

16. The method of claim 15 wherein said internal combustion engine includes a first controllable valve associated with said exhaust pipe, and wherein said selectively directing of said at least a portion of said exhaust gases from said exhaust pipe to said canister comprising controlling said first controllable valve.

17. The method of claim 16 wherein said controlling of said first controllable valve includes opening said first controllable valve during a predetermined period of time after a cold start of said internal combustion engine.

18. The method of claim 16 wherein said internal combustion engine includes an exhaust gas catalyzer associated with said exhaust pipe, and wherein said method further includes detecting the temperature of said exhaust gas catalyzer and controlling said first controllable valve in response to said detected temperature of said exhaust gas catalyzer.

19. The method of claim 18 including selecting said detected temperature of said exhaust gas catalyzer based upon at least one operating parameter of said internal combustion engine.

20. The method of claim 15 wherein said internal combustion engine includes an injector for injecting a mixture of fuel and air into said internal combustion engine, a first conduit for connecting said canister to said fuel tank and a second conduit for connecting said canister to said injector, said method including blocking said first conduit connecting said canister to said fuel tank and said second conduit connecting said connector to said injector while directing said exhaust gases to said canister.

* * * * *